US011641546B2

(12) United States Patent
Chang et al.

(10) Patent No.: US 11,641,546 B2
(45) Date of Patent: May 2, 2023

(54) FREQUENCY-DOMAIN HAPTIC WAVEFORM COMPENSATION FOR HAPTIC TRANSDUCERS

(71) Applicant: Cirrus Logic International Semiconductor Ltd., Edinburgh (GB)

(72) Inventors: Kok Chin Chang, Edinburgh (GB); Marco Janko, Austin, TX (US); Kyle Wilkinson, South Lake Tahoe, CA (US)

(73) Assignee: Cirrus Logic, Inc., Austin, TX (US)

( * ) Notice: Subject to any disclaimer, the term of this patent is extended or adjusted under 35 U.S.C. 154(b) by 411 days.

(21) Appl. No.: 16/715,261

(22) Filed: Dec. 16, 2019

(65) Prior Publication Data

US 2020/0396538 A1    Dec. 17, 2020

Related U.S. Application Data

(60) Provisional application No. 62/862,344, filed on Jun. 17, 2019.

(51) Int. Cl.
*H04R 3/04* (2006.01)
*G06F 3/041* (2006.01)
*G06F 3/01* (2006.01)

(52) U.S. Cl.
CPC .............. *H04R 3/04* (2013.01); *G06F 3/016* (2013.01); *G06F 3/0416* (2013.01)

(58) Field of Classification Search
CPC .......... G06F 3/016; G06F 3/0416; H04R 3/04
USPC ........................................................ 345/156
See application file for complete search history.

(56) References Cited

U.S. PATENT DOCUMENTS

| | | | | |
|---|---|---|---|---|
| 6,590,366 B1* | 7/2003 | Browning | ............ | F16C 32/0451 310/90.5 |
| 2003/0069490 A1* | 4/2003 | Narimatsu | ......... | A61B 5/02125 600/407 |
| 2003/0210797 A1* | 11/2003 | Kreifeldt | .................. | H04R 3/02 381/93 |
| 2014/0167941 A1* | 6/2014 | Rank | ........................ | G08B 6/00 340/407.1 |
| 2014/0218185 A1* | 8/2014 | Cruz-Hernandez | ...... | G08B 6/00 340/407.1 |
| 2017/0053502 A1* | 2/2017 | Shah | ........................ | G08B 6/00 |
| 2017/0285747 A1* | 10/2017 | Chen | ....................... | G06F 3/016 |
| 2019/0080568 A1 | 3/2019 | Shah | | |
| 2019/0295755 A1* | 9/2019 | Konradi | .................. | G06F 3/016 |

OTHER PUBLICATIONS

International Search Report and Written Opinion of the International Searching Authority, International Application No. PCT/US2020-034543, dated Aug. 7, 2020.

* cited by examiner

*Primary Examiner* — Jimmy H Nguyen
(74) *Attorney, Agent, or Firm* — Jackson Walker L.L.P.

(57) ABSTRACT

A method for minimizing post-playback oscillation during playback of a haptic playback waveform to a haptic transducer may include determining whether a frequency response of the haptic playback waveform has a notch with a notch frequency at approximately a resonant frequency of the haptic transducer and, responsive to the notch frequency differing from the resonant frequency, modifying the haptic playback waveform for playback to the haptic transducer by shifting the notch frequency to approximately the resonant frequency.

15 Claims, 5 Drawing Sheets

FREQUENCY-DOMAIN HAPTIC WAVEFORM COMPENSATION FOR HAPTIC TRANSDUCERS

RELATED APPLICATION

The present disclosure claims priority to U.S. Provisional Patent Application Ser. No. 62/862,344, filed Jun. 17, 2019, which is incorporated by reference herein in its entirety.

FIELD OF DISCLOSURE

The present disclosure relates in general to electronic devices with user interfaces, (e.g., mobile devices, game controllers, instrument panels, etc.), and more particularly, a haptic system for use in a system for mechanical button replacement in a mobile device, for use in haptic feedback for capacitive sensors, and/or other suitable applications.

BACKGROUND

Linear resonant actuators (LRAs) and other vibrational actuators (e.g., rotational actuators, vibrating motors, etc.) are increasingly being used in mobile devices (e.g., mobile phones, personal digital assistants, video game controllers, etc.) to generate vibrational feedback for user interaction with such devices. Typically, a force/pressure sensor detects user interaction with the device (e.g., a finger press on a virtual button of the device) and in response thereto, the linear resonant actuator vibrates to provide feedback to the user. For example, a linear resonant actuator may vibrate in response to force to mimic to the user the feel of a mechanical button click.

An LRA may include a mass-spring system with an electromotive actuator able to apply force to the mass, with the mass centered in a rest position by a spring or pair of springs. The mass may have embedded within it one or more permanent magnets. One or more coils of wire may apply electromagnetic force to the magnets, moving the mass. Current applied to the one or more coils of wire may cause the mass to move with respect to its housing, and vibrate therein. In typical use, an alternating voltage is applied to the coil terminals, causing an alternating current in the coil, and thus an alternating force on the mass, and the mass moves in response to the applied force. The housing may also include stops or other damping structures to limit excursion and prevent damage if the driving force is too large. As the mass vibrates within the housing, reaction forces generated by the springs and the electromotive drive may be felt as haptic sensations by a person holding the LRA or a mobile device including the LRA.

Taken together, the mass and springs of an LRA form a mechanical resonant system. For a given drive voltage, the greatest mass vibration may be achieved when the drive oscillation frequency equals the mass-spring natural or resonant frequency. In other words, resonant operation may deliver the highest vibrational acceleration per energy input.

Often, LRAs used in mobile devices are designed to have a resonant frequency $f_0$ in the range of 100 Hz-250 Hz. This resonance characteristic implies, in most cases, a relatively large acceleration rise time. Additionally, after the LRA is in motion, decreasing the amplitude of the input voltage will not decrease the output amplitude of the LRA instantaneously. Instead, an LRA may exhibit post-playback oscillations, and such oscillations are often referred to as "ringing."

The limitation of fall times and the resultant ringing constrains the design of haptic effects by limiting the time in which stimuli is generated, and limiting the sharpness of stimuli delivered. This limitation leads to a necessity to develop approaches to accurately control an amplitude of LRA oscillation. The design of haptic effects that have a pleasant user experience may include minimum post-playback oscillations. Such a result may be achieved by carefully designing an input waveform to the actuator, that purposefully minimizes the ringing after the playback has ended. However, haptic actuators are not free from part-to-part variation which may limit the effectiveness of such careful design when applied to different LRA parts. To compensate for part-to-part variations, an approach is needed to preserve the intended minimal ringing characteristics of a designed input waveform.

SUMMARY

In accordance with the teachings of the present disclosure, the disadvantages and problems associated with haptic feedback in a mobile device may be reduced or eliminated.

In accordance with embodiments of the present disclosure, a method for minimizing post-playback oscillation during playback of a haptic playback waveform to a haptic transducer may include determining whether a frequency response of the haptic playback waveform has a notch with a notch frequency at approximately a resonant frequency of the haptic transducer and, responsive to the notch frequency differing from the resonant frequency, modifying the haptic playback waveform for playback to the haptic transducer by shifting the notch frequency to approximately the resonant frequency.

In accordance with these and other embodiments of the present disclosure, a system for minimizing post-playback oscillation during playback of a haptic playback waveform to a haptic transducer may include one or more inputs for receiving information regarding a resonant frequency of the haptic transducer and a processing subsystem configured to determine whether a frequency response of the haptic playback waveform has a notch with a notch frequency at approximately the resonant frequency of the haptic transducer and, responsive to the notch frequency differing from the resonant frequency, modify the haptic playback waveform for playback to the haptic transducer by shifting the notch frequency to approximately the resonant frequency.

In accordance with these and other embodiments of the present disclosure, a mobile device may include a haptic transducer and a haptic control subsystem configured to determine whether a frequency response of a haptic playback waveform has a notch with a notch frequency at approximately the resonant frequency of the haptic transducer and, responsive to the notch frequency differing from the resonant frequency, modify the haptic playback waveform for playback to the haptic transducer by shifting the notch frequency to approximately the resonant frequency.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
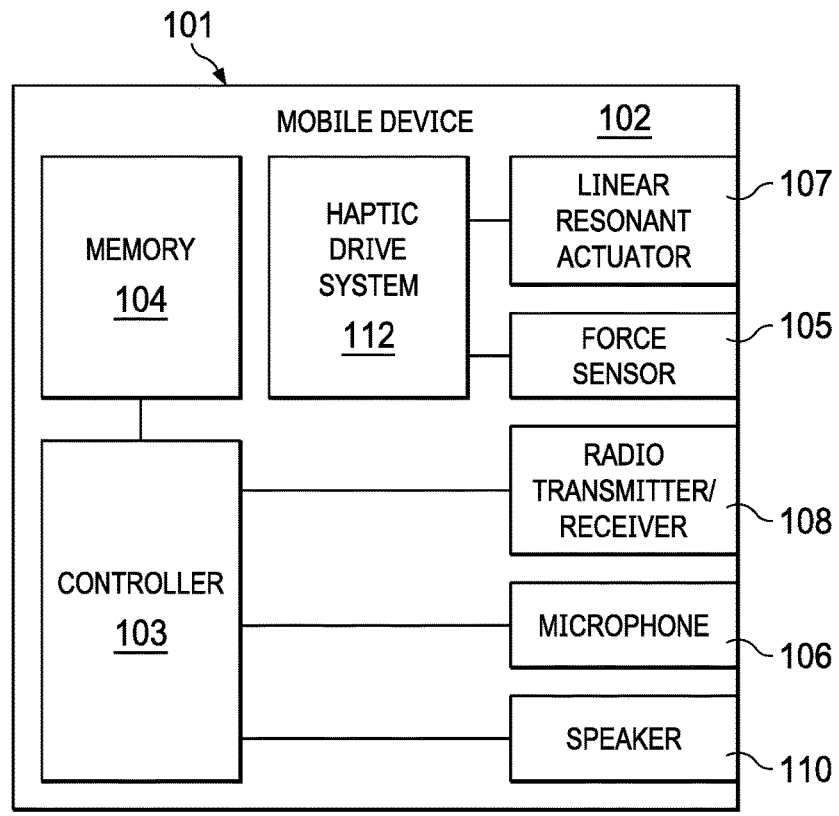
FIG. 1 illustrates a block diagram of selected components of an example mobile device, in accordance with embodiments of the present disclosure.

FIG. 1 illustrates a block diagram of selected components of an example electronic device 102, in accordance with embodiments of the present disclosure. As shown in FIG. 1, electronic device 102 may comprise an enclosure 101, a controller 103, a memory 104, a force sensor 105, a microphone 106, a linear resonant actuator 107, a radio transmitter/receiver 108, a speaker 110, and a haptic drive system 112.

Enclosure 101 may comprise any suitable housing, casing, or other enclosure for housing the various components of electronic device 102. Enclosure 101 may be constructed from plastic, metal, and/or any other suitable materials. In addition, in some embodiments, enclosure 101 may be adapted (e.g., sized and shaped) such that electronic device 102 is readily transported on a person of a user of electronic device 102. Accordingly, electronic device 102 may include but is not limited to a smart phone, a tablet computing device, a handheld computing device, a personal digital assistant, a notebook computer, a video game controller, or any other device that may be readily transported on a person of a user of electronic device 102. Further, electronic device 102 may include larger devices that are not readily transported by a user, such as a television, appliance, automated teller machine, automobile, aircraft, watercraft, building installation, or other device.

Controller 103 may be housed within enclosure 101 and may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, controller 103 interprets and/or executes program instructions and/or processes data stored in memory 104 and/or other computer-readable media accessible to controller 103.

Memory 104 may be housed within enclosure 101, may be communicatively coupled to controller 103, and may include any system, device, or apparatus configured to retain program instructions and/or data for a period of time (e.g., computer-readable media). Memory 104 may include random access memory (RAM), electrically erasable programmable read-only memory (EEPROM), a Personal Computer Memory Card International Association (PCMCIA) card, flash memory, magnetic storage, opto-magnetic storage, or any suitable selection and/or array of volatile or non-volatile memory that retains data after power to electronic device 102 is turned off.

Microphone 106 may be housed at least partially within enclosure 101, may be communicatively coupled to controller 103, and may comprise any system, device, or apparatus configured to convert sound incident at microphone 106 to an electrical signal that may be processed by controller 103, wherein such sound is converted to an electrical signal using a diaphragm or membrane having an electrical capacitance that varies as based on sonic vibrations received at the diaphragm or membrane. Microphone 106 may include an electrostatic microphone, a condenser microphone, an electret microphone, a microelectromechanical systems (MEMs) microphone, or any other suitable capacitive microphone.

Radio transmitter/receiver 108 may be housed within enclosure 101, may be communicatively coupled to controller 103, and may include any system, device, or apparatus configured to, with the aid of an antenna, generate and transmit radio-frequency signals as well as receive radio-frequency signals and convert the information carried by such received signals into a form usable by controller 103. Radio transmitter/receiver 108 may be configured to transmit and/or receive various types of radio-frequency signals, including without limitation, cellular communications (e.g., 2G, 3G, 4G, LTE, etc.), short-range wireless communications (e.g., BLUETOOTH), commercial radio signals, television signals, satellite radio signals (e.g., GPS), Wireless Fidelity, etc.

A speaker 110 may be housed at least partially within enclosure 101 or may be external to enclosure 101, may be communicatively coupled to controller 103, and may comprise any system, device, or apparatus configured to produce sound in response to electrical audio signal input. In some embodiments, a speaker may comprise a dynamic loudspeaker, which employs a lightweight diaphragm mechanically coupled to a rigid frame via a flexible suspension that constrains a voice coil to move axially through a cylindrical magnetic gap. When an electrical signal is applied to the voice coil, a magnetic field is created by the electric current in the voice coil, making it a variable electromagnet. The coil and the driver's magnetic system interact, generating a mechanical force that causes the coil (and thus, the attached cone) to move back and forth, thereby reproducing sound under the control of the applied electrical signal coming from the amplifier.

Force sensor 105 may be housed within enclosure 101, and may include any suitable system, device, or apparatus for sensing a force, a pressure, or a touch (e.g., an interaction with a human finger) and generating an electrical or electronic signal in response to such force, pressure, or touch. In some embodiments, such electrical or electronic signal may be a function of a magnitude of the force, pressure, or touch applied to the force sensor. In these and other embodiments, such electronic or electrical signal may comprise a general purpose input/output signal (GPIO) associated with an input signal to which haptic feedback is given (e.g., a capacitive touch screen sensor or other capacitive sensor to which haptic feedback is provided). For purposes of clarity and exposition in this disclosure, the term "force" as used herein may refer not only to force, but to physical quantities indicative of force or analogous to force, such as, but not limited to, pressure and touch.

Linear resonant actuator 107 may be housed within enclosure 101, and may include any suitable system, device, or apparatus for producing an oscillating mechanical force across a single axis. For example, in some embodiments, linear resonant actuator 107 may rely on an alternating current voltage to drive a voice coil pressed against a moving mass connected to a spring. When the voice coil is driven at the resonant frequency of the spring, linear resonant actuator 107 may vibrate with a perceptible force. Thus, linear resonant actuator 107 may be useful in haptic applications within a specific frequency range. While, for the purposes of clarity and exposition, this disclosure is described in relation to the use of linear resonant actuator 107, it is understood that any other type or types of vibrational actuators (e.g., eccentric rotating mass actuators) may be used in lieu of or in addition to linear resonant actuator 107. In addition, it is also understood that actuators arranged to produce an oscillating mechanical force across multiple axes may be used in lieu of or in addition to linear resonant actuator 107. As described elsewhere in this disclosure, a linear resonant actuator 107, based on a signal received from haptic drive system 112, may render haptic feedback to a user of electronic device 102 for at least one of mechanical button replacement and capacitive sensor feedback.

Haptic drive system 112 may be housed within enclosure 101, may be communicatively coupled to force sensor 105 and linear resonant actuator 107, and may include any system, device, or apparatus configured to receive a signal from force sensor 105 indicative of a force applied to electronic device 102 (e.g., a force applied by a human finger to a virtual button of electronic device 102) and generate an electronic signal for driving linear resonant actuator 107 in response to the force applied to electronic device 102. Detail of an example integrated haptic system in accordance with embodiments of the present disclosure is depicted in FIG. 2.

Although specific example components are depicted above in FIG. 1 as being integral to electronic device 102 (e.g., controller 103, memory 104, user interface 105, microphone 106, radio transmitter/receiver 108, speakers(s) 110), an electronic device 102 in accordance with this disclosure may comprise one or more components not specifically enumerated above. For example, although FIG. 1 depicts certain user interface components, electronic device 102 may include one or more other user interface components in addition to those depicted in FIG. 1, including but not limited to a keypad, a touch screen, and a display, thus allowing a user to interact with and/or otherwise manipulate electronic device 102 and its associated components.

Figure 2:
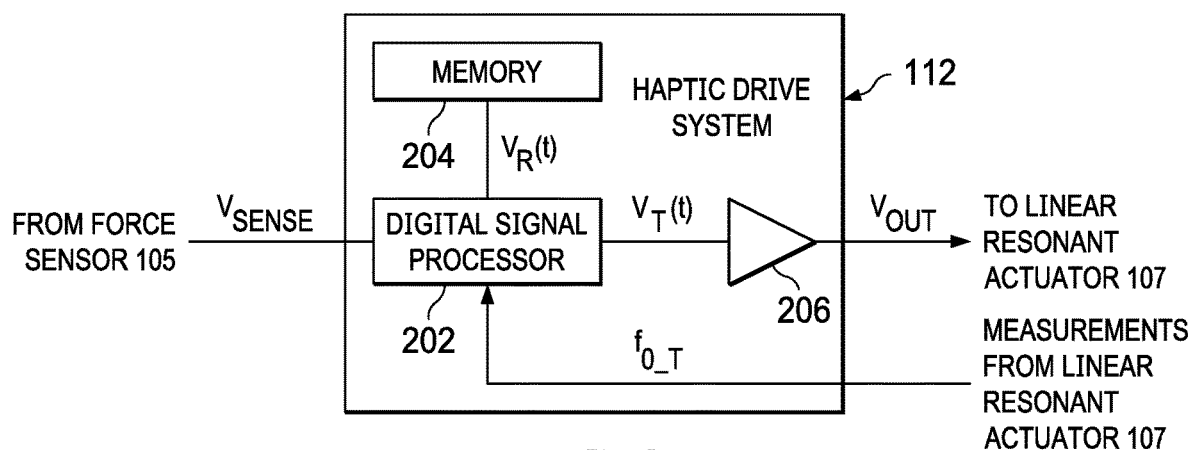
FIG. 2 illustrates a block diagram of selected components of an example haptic drive system, in accordance with embodiments of the present disclosure.

FIG. 2 illustrates a block diagram of selected components of an example haptic drive system 112, in accordance with embodiments of the present disclosure. In some embodiments, haptic drive system 112 of FIG. 2 may be used to implement haptic drive system 112 of FIG. 1. As shown in FIG. 2, haptic drive system 112 may include a digital signal processor (DSP) 202, a memory 204, and an amplifier 206.

DSP 202 may include any system, device, or apparatus configured to interpret and/or execute program instructions and/or process data. In some embodiments, DSP 202 may interpret and/or execute program instructions and/or process data stored in memory 204 and/or other computer-readable media accessible to DSP 202.

Memory 204 may be communicatively coupled to DSP 202, and may include any system, device, or apparatus configured to retain program instructions and/or data for a period of time (e.g., computer-readable media). Memory 204 may include random access memory (RAM), electrically erasable programmable read-only memory (EEPROM), a Personal Computer Memory Card International Association (PCMCIA) card, flash memory, magnetic storage, opto-magnetic storage, or any suitable selection and/or array of volatile or non-volatile memory that retains data after power to electronic device 102 is turned off. Although FIG. 2 depicts haptic drive system 112 as having memory 204 integral thereto, in some embodiments haptic drive system 112 may not include a memory, and may instead utilize a memory external to haptic drive system 112, such as memory 104, to perform the functionality of memory 204 described herein.

Amplifier 206 may be electrically coupled to DSP 202 and may comprise any suitable electronic system, device, or apparatus configured to increase the power of an input signal $V_{IN}$ (e.g., a time-varying voltage or current) to generate an output signal $V_{OUT}$. For example, amplifier 206 may use electric power from a power supply (not explicitly shown) to increase the amplitude of a signal. Amplifier 206 may include any suitable amplifier class, including without limitation, a Class-D amplifier.

In operation, memory 204 may store a reference drive waveform $v_R(t)$. Reference drive waveform $v_R(t)$ may comprise a drive waveform optimized for use with a reference linear resonant actuator having a resonant frequency $f_{0\_R}$, which value may also be stored in memory 204. Such reference linear resonant actuator may be similar in all material respects to linear resonant actuator 107 present in mobile device 101, except for differences due to manufacturing or process variations and tolerances, such that a resonant frequency $f_{0\_T}$ of linear resonant actuator 107 (which may be referred to herein as the target resonant frequency) may vary from resonant frequency $f_{0\_R}$ of the reference linear resonant actuator in accordance with such process variations and tolerances.

Reference drive waveform $v_R(t)$ may be derived in any suitable manner, including testing and characterization of the reference linear resonant actuator, and reference resonant frequency $f_{0\_R}$ may be determined based on measurement of such reference resonant frequency $f_{0\_R}$. For example, in some embodiments, the reference linear resonant actuator may be tested and characterized to determine resonant frequency $f_{0\_R}$ and optimize reference drive waveform $v_R(t)$ such that reference drive waveform $v_R(t)$ provides a desired haptic effect for the reference linear resonant actuator, and then reference drive waveform $v_R(t)$ and reference resonant frequency $f_{0\_R}$ may be stored in memory 204 of haptic drive system 112 for mobile devices employing a linear resonant actuator similar in all material respects to the reference resonant actuator other than differences due to manufacturing or process variations and tolerances. For example, in some instances, to minimize post-playback oscillation, reference drive waveform $v_R(t)$ may have a frequency response with a notch at reference resonant frequency $f_{0\_R}$. A notch may be a narrow band of frequencies (e.g., a range on the order of 10 Hz) in which an amplitude of reference drive waveform $v_R(t)$ is significantly lower than that of frequencies outside the narrow band of frequencies. However, should target resonant frequency $f_{0\_T}$ of linear resonant actuator 107 vary significantly from reference resonant frequency $f_{0\_R}$, significant post-playback oscillation may still occur.

In operation, digital signal processor 202 may, responsive to receiving an appropriate triggering signal $V_{SENSE}$ from force sensor 105 (e.g., force sensor 105 detecting user interaction with force sensor 105) generate and output a target drive waveform $v_T(t)$ which may be amplified by amplifier 206 to generate an output drive signal $V_{OUT}$ that drives linear resonant actuator 107. As described in greater detail below, digital signal processor 202 may derive target drive waveform $v_T(t)$ from reference drive waveform $v_R(t)$, modifying reference drive waveform $v_R(t)$ to generate target drive waveform $v_T(t)$ using frequency-domain haptic waveform compensation, as described in greater detail below.

As shown in FIG. 2, digital signal processor 202 may determine target resonant frequency $f_{0\_T}$ based on measurements of linear resonant actuator 107. For example, in some embodiments, digital signal processor 202 may continually or periodically measure target resonant frequency $f_{0\_T}$, which may vary over time due to numerous factors, including without limitation temperature, and adapt target drive waveform $v_T(t)$ as target resonant frequency $f_{0\_T}$ varies over time. However, in other embodiments, target resonant frequency $f_{0\_T}$ may simply be measured once during manufacturing or at its first start up, with the value of target resonant frequency $f_{0\_T}$ recorded in memory 204 and used for generation of target drive waveform $v_T(t)$ throughout the lifetime of haptic drive system 112 and linear resonant actuator 107.

As mentioned above, digital signal processor 202 may generate target drive waveform $v_T(t)$ by applying frequency-domain compensation to reference drive waveform $v_R(t)$. To perform such frequency-domain compensation, digital signal processor 202 may determine a frequency response of reference drive waveform $v_R(t)$ and determine whether a notch exists in the frequency response of reference drive waveform $v_R(t)$. In the absence of a notch in the frequency response of reference drive waveform $v_R(t)$, digital signal processor 202 may generate target drive waveform $v_T(t)$ by applying a notch filter at target resonant frequency $f_{0\_T}$ to reference drive waveform $v_R(t)$, such that target drive waveform $v_T(t)=N(t)v_R(t)$, where N(t) is a time-domain representation of a notch filter with a notch frequency at target resonant frequency $f_{0\_T}$.

On the other hand, in response to the presence of a notch in the frequency response of reference drive waveform $v_R(t)$, digital signal processor 202 may determine whether such notch appears at or sufficiently close (e.g., within 5 Hz) to target resonant frequency $f_{0\_T}$ of linear resonant actuator 107. In response to the notch in the frequency response of reference drive waveform $v_R(t)$ occurring at a notch frequency $f_N$ other than target resonant frequency $f_{0\_T}$, digital signal processor 202 may generate target drive waveform $v_T(t)$ by shifting the notch in the frequency response of reference drive waveform $v_R(t)$ to target resonant frequency $f_{0\_T}$. In some embodiments, digital signal processor 202 may perform this frequency-domain shifting by scaling reference drive waveform $v_R(t)$ to generate target drive waveform $v_T(t)$. For example, a time scaling factor c may be defined as a ratio between notch frequency $f_N$ of reference drive waveform $v_R(t)$ and target resonant frequency $f_{0\_T}$ (e.g., $c=f_N/f_{0\_T}$), and digital signal processor 202 may generate target drive waveform $v_T(t)=v_R(ct)$. In some embodiments, digital signal processor 202 may generate target drive waveform $v_T(t)=av_R(ct)$, where a is an amplitude compensation factor to compensate such that depth of the resulting notch in a frequency response of target drive waveform $v_T(t)$ is equal to the depth of the notch in the frequency response of reference drive waveform $v_R(t)$.

Figure 3:
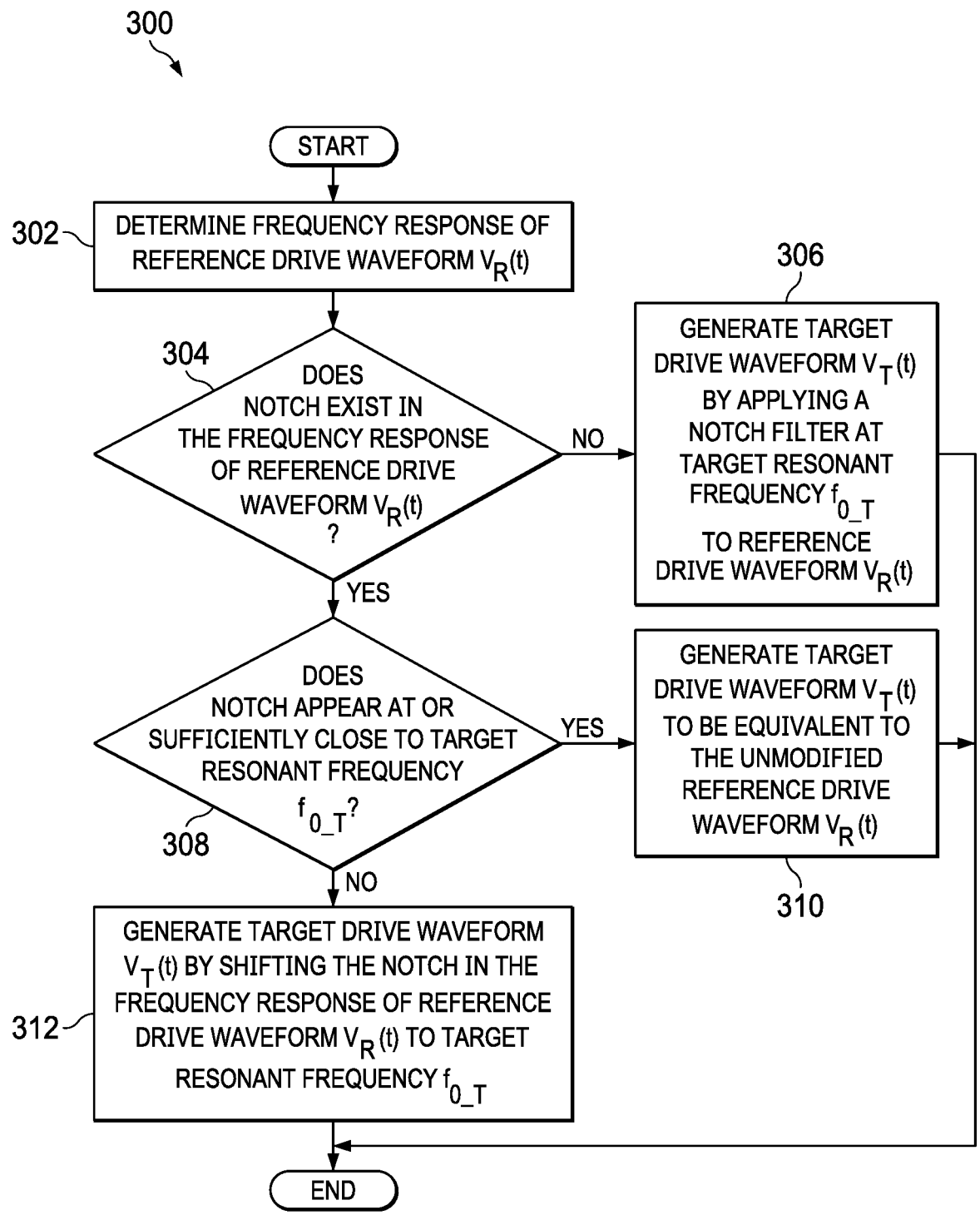
FIG. 3 illustrates a flow chart of an example method for frequency-domain haptic waveform compensation for a haptic transducer, in accordance with embodiments of the present disclosure.

FIG. 3 illustrates a flow chart of an example method 300 for frequency-domain haptic waveform compensation for a haptic transducer, in accordance with embodiments of the present disclosure. According to some embodiments, method 300 may begin at step 302. As noted above, teachings of the present disclosure may be implemented in a variety of configurations of electronic device 102. As such, the preferred initialization point for method 300 and the order of the steps comprising method 300 may depend on the implementation chosen.

At step 302, digital signal processor 202 may determine a frequency response of reference drive waveform $v_R(t)$. At step 304, digital signal processor 202 may determine whether a notch exists in the frequency response of reference drive waveform $v_R(t)$. In the absence of a notch in the frequency response of reference drive waveform $v_R(t)$, method 300 may proceed to step 306. In the presence of a notch in the frequency response of reference drive waveform $v_R(t)$, method 300 may proceed to step 308.

At step 306, in response to the absence of a notch in the frequency response of reference drive waveform $v_R(t)$, digital signal processor 202 may generate target drive waveform $v_T(t)$ by applying a notch filter at target resonant frequency $f_{0\_T}$ to reference drive waveform $v_R(t)$. After completion of step 306, method 300 may end.

At step 308, in response to the presence of a notch in the frequency response of reference drive waveform $v_R(t)$, digital signal processor 202 may determine whether such notch appears at or sufficiently close (e.g., within 5 Hz) to target resonant frequency $f_{0\_T}$ of linear resonant actuator 107. If such notch appears at or sufficiently close (e.g., within 5 Hz) to target resonant frequency $f_{0\_T}$ of linear resonant actuator 107, method 300 may proceed to step 310. Otherwise, if the notch in the frequency response of reference drive waveform $v_R(t)$ occurs at a notch frequency $f_N$ other than or near target resonant frequency $f_{0\_T}$, method 300 may proceed to step 312.

At step 310, in response to the notch in the frequency response of reference drive waveform $v_R(t)$ appearing at or sufficiently close to target resonant frequency $f_{0\_T}$ of linear resonant actuator 107, digital signal processor 202 may generate target drive waveform $v_T(t)$ to be equivalent to the unmodified reference drive waveform $v_R(t)$ (e.g., $v_T(t)=v_R(t)$). After completion of step 310, method 300 may end.

At step 312, in response to the notch in the frequency response of reference drive waveform $v_R(t)$ occurring at a notch frequency $f_N$ other than target resonant frequency $f_{0\_T}$, digital signal processor 202 may generate target drive waveform $v_T(t)$ by shifting the notch in the frequency response of reference drive waveform $v_R(t)$ to target resonant frequency $f_{0\_T}$ (e.g., $v_T(t)=av_R(ct)$, as described above). After completion of step 312, method 300 may end.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented in whole or part using controller 103, digital signal processor 202, and/or any other system operable to implement method 300. In certain embodiments, method 300 may be implemented partially or fully in software and/or firmware embodied in computer-readable media.

Figure 4:
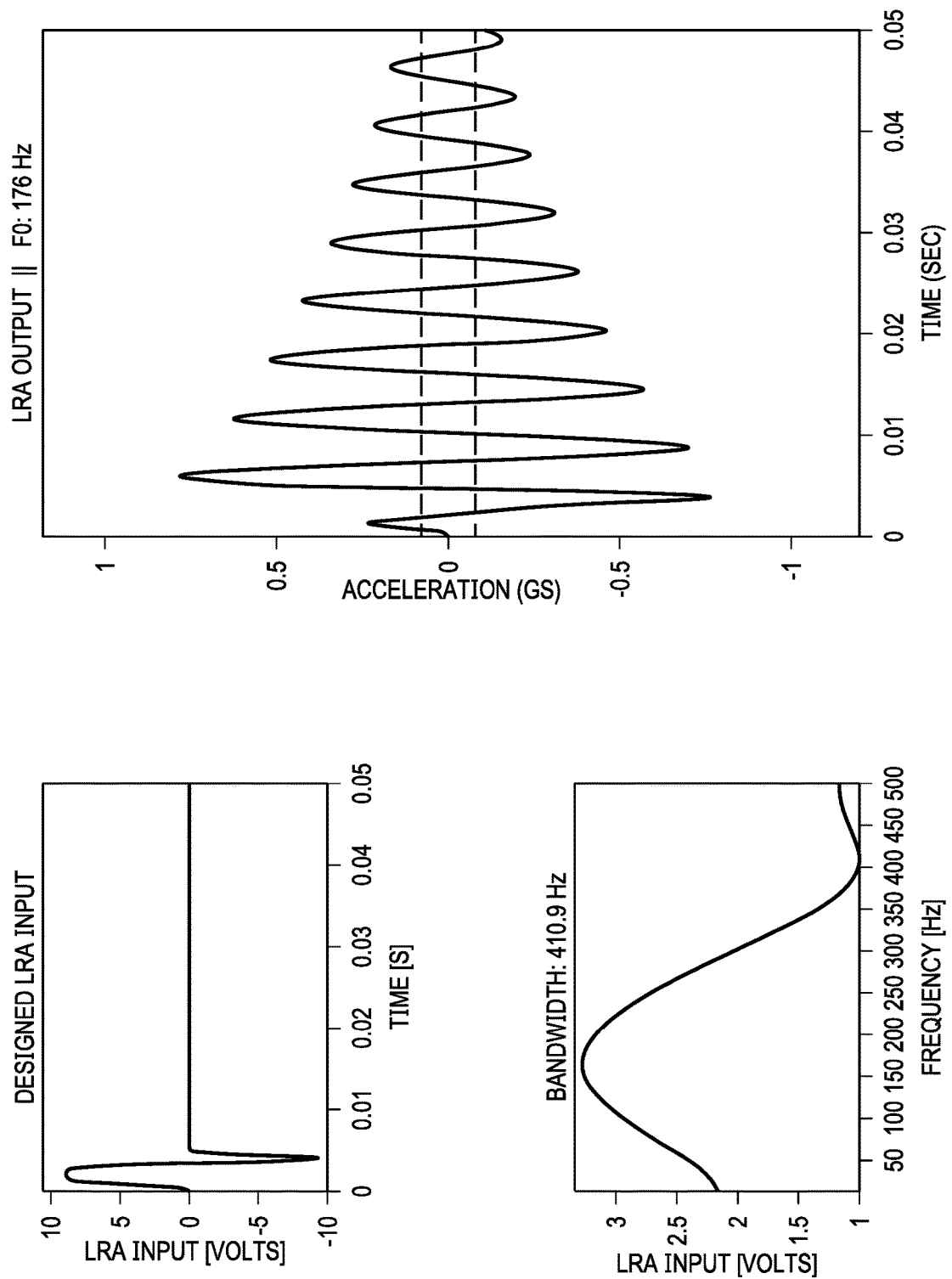
FIG. 4 illustrates graphs of an example drive waveform without a frequency notch near a haptic transducer's resonant frequency and resulting acceleration versus time of the haptic transducer driven by the drive waveform, in accordance with embodiments of the present disclosure.

FIG. 4 illustrates graphs of an example drive waveform without a frequency notch near resonant frequency $f_{0\_T}$ of linear resonant actuator 107 and resulting acceleration versus time of linear resonant actuator 107 driven by the drive waveform, in accordance with embodiments of the present disclosure. FIG. 4 illustrates the drive waveform both in the time domain (e.g., top left diagram of FIG. 4) and correspondingly in the frequency domain (e.g., bottom left diagram of FIG. 4). FIG. 4 further shows an example resulting acceleration waveform in the time domain for linear resonant actuator 107 (e.g., right diagram of FIG. 4) responsive to the drive waveform. The dashed line in the acceleration waveform represents a maximum acceptable ringing level. Because the ringing of the output waveform exceeds the maximum acceptable ringing level, a notch filter may be implemented in accordance with the methods and systems described above to filter the frequency content in the drive waveform at and/or near resonant frequency $f_{0\_T}$ of linear resonant actuator 107 to ensure that the ringing at/near resonant frequency $f_{0\_T}$ is within the maximum acceptable ringing level.

Figure 5:
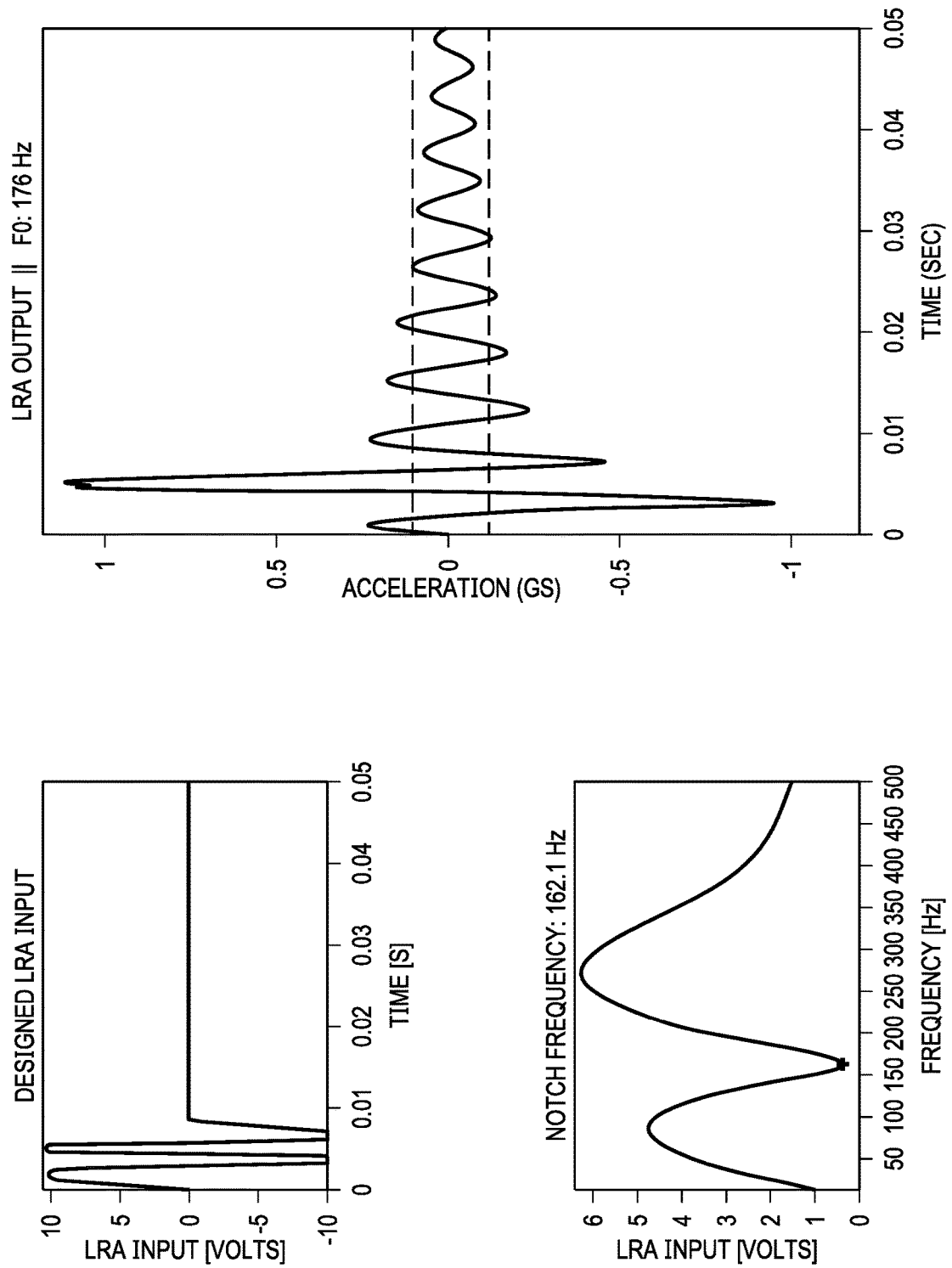
FIG. 5 illustrates graphs of an example drive waveform with a frequency notch far from a haptic transducer's resonant frequency and resulting acceleration versus time of the haptic transducer driven by the drive waveform, in accordance with embodiments of the present disclosure.

FIG. 5 illustrates graphs of an example drive waveform with a frequency notch far from resonant frequency $f_{0\_T}$ of linear resonant actuator 107 and resulting acceleration versus time of linear resonant actuator 107 driven by the drive waveform, in accordance with embodiments of the present disclosure. Similar to FIG. 4, FIG. 5 illustrates the drive waveform both in the time domain (e.g., top left diagram of FIG. 5) and correspondingly in the frequency domain (e.g., bottom left diagram of FIG. 5). FIG. 5 further shows an example resulting acceleration waveform in the time domain for linear resonant actuator 107 (e.g., right diagram of FIG. 5) responsive to the drive waveform. The dashed line in the acceleration waveform represents a maximum acceptable ringing level. As shown in FIG. 5, the ringing of the acceleration waveform exceeds the maximum acceptable ringing level.

Figure 6:
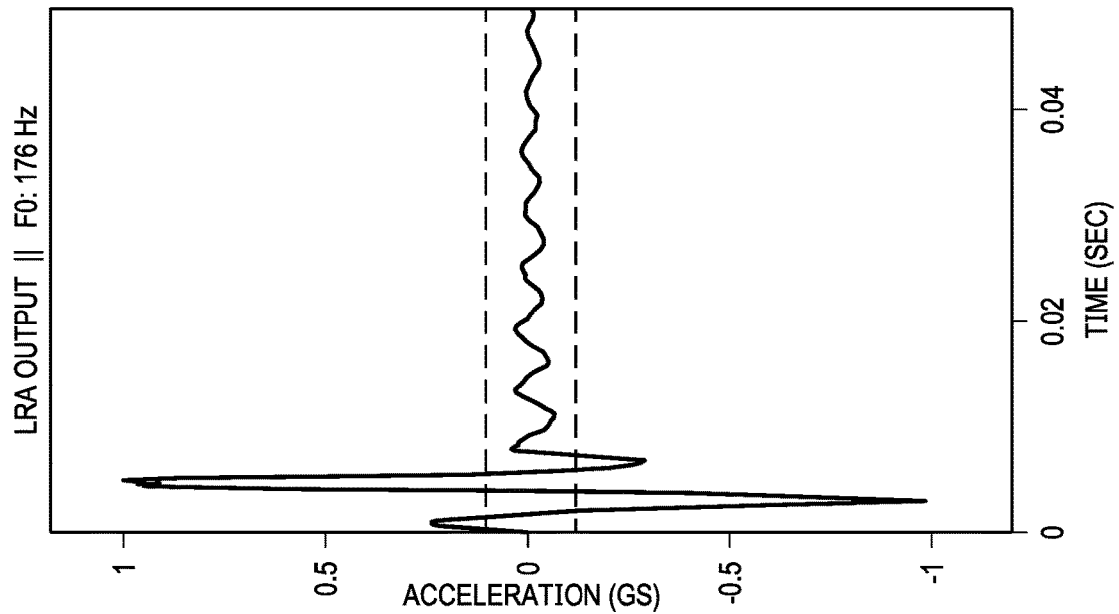
FIG. 6 illustrates graphs of an example drive waveform with a frequency notch near a haptic transducer's resonant frequency and resulting acceleration versus time of the haptic transducer driven by the drive waveform, in accordance with embodiments of the present disclosure.
Figure 6:
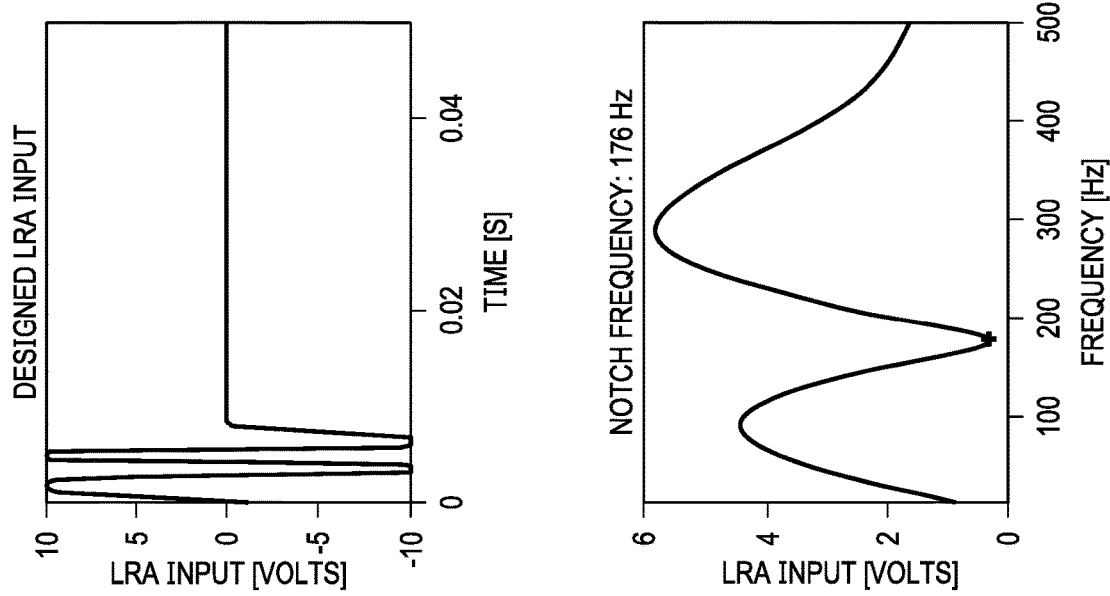

FIG. 6 illustrates graphs of an example drive waveform with a frequency notch near resonant frequency $f_{0\_T}$ of linear resonant actuator 107 and resulting acceleration versus time of linear resonant actuator 107 driven by the drive waveform, in accordance with embodiments of the present disclosure. As mentioned above, haptic drive system 112 may generate target drive waveform $v_T(t)$ (e.g., the drive waveform of FIG. 6) by shifting the notch in the frequency response of reference drive waveform $v_R(t)$ (e.g., the drive waveform of FIG. 5) to resonant frequency $f_{0\_T}$ in response to the presence of a notch far away from resonant frequency $f_{0\_T}$. Similar to FIGS. 4 and 5, FIG. 6 illustrates the drive waveform both in the time domain (e.g., top left diagram of FIG. 6) and correspondingly in the frequency domain (e.g., bottom left diagram of FIG. 6). FIG. 6 further shows an example resulting acceleration waveform in the time domain for linear resonant actuator 107 (e.g., right diagram of FIG. 6) responsive to the drive waveform. The dashed line in the acceleration waveform represents a maximum acceptable ringing level. As shown in FIG. 6, the ringing of the acceleration waveform remains within the maximum acceptable ringing level.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A method for minimizing post-playback oscillation during playback of a haptic playback waveform to a haptic transducer, comprising:
   determining whether a frequency response of the haptic playback waveform has a notch with a notch frequency at approximately a resonant frequency of the haptic transducer; and
   responsive to the notch frequency differing from the resonant frequency, modifying the haptic playback waveform for playback to the haptic transducer by shifting the notch frequency to approximately the resonant frequency.

2. The method of claim 1, further comprising, responsive to an absence of a notch in the frequency response of the haptic playback waveform, modifying the haptic playback waveform for playback to the haptic transducer by applying a notch filter at approximately the resonant frequency to the haptic playback waveform.

3. The method of claim 1, further comprising responsive to the notch frequency being approximately equal to the resonant frequency, playing back the haptic playback waveform without modification to the haptic transducer.

4. The method of claim 1, wherein the shifting of the notch frequency to approximately the resonant frequency comprises:
   determining a time scaling factor as a ratio between the notch frequency and the resonant frequency; and
   time scaling the haptic playback waveform by the time scaling factor, such that the haptic playback waveform as modified $v_T(t)=v_R(ct)$, where $v_R(t)$ defines the haptic playback waveform without modification as a function of time, and c is the time scaling factor.

5. The method of claim 1, wherein the shifting of the notch frequency to approximately the resonant frequency further comprises applying an amplitude compensation factor to compensate the haptic playback waveform as modified such that a depth of the resulting notch in the frequency response of the haptic playback waveform as modified is approximately equal to the depth of the notch in the frequency response of the haptic playback waveform prior to modification.

6. A system for minimizing post-playback oscillation during playback of a haptic playback waveform to a haptic transducer, comprising:
   one or more inputs for receiving information regarding a resonant frequency of the haptic transducer; and
   a processing subsystem configured to:
      determine whether a frequency response of the haptic playback waveform has a notch with a notch frequency at approximately the resonant frequency of the haptic transducer; and
      responsive to the notch frequency differing from the resonant frequency, modify the haptic playback waveform for playback to the haptic transducer by shifting the notch frequency to approximately the resonant frequency.

7. The system of claim 6, the processing subsystem further configured to, responsive to an absence of a notch in the frequency response of the haptic playback waveform, modify the haptic playback waveform for playback to the haptic transducer by applying a notch filter at approximately the resonant frequency to the haptic playback waveform.

8. The system of claim 6, the processing subsystem further configured to, responsive to the notch frequency being approximately equal to the resonant frequency, play back the haptic playback waveform without modification to the haptic transducer.

9. The system of claim 6, wherein the shifting of the notch frequency to approximately the resonant frequency comprises:
   determining a time scaling factor as a ratio between the notch frequency and the resonant frequency; and
   time scaling the haptic playback waveform by the time scaling factor, such that the haptic playback waveform as modified $v_T(t)=v_R(ct)$, where $v_R(t)$ defines the haptic playback waveform without modification as a function of time, and c is the time scaling factor.

10. The system of claim 9, wherein the shifting of the notch frequency to approximately the resonant frequency further comprises applying an amplitude compensation factor to compensate the haptic playback waveform as modified such that a depth of the resulting notch in the frequency response of the haptic playback waveform as modified is approximately equal to the depth of the notch in the frequency response of the haptic playback waveform prior to modification.

11. A mobile device, comprising:
   a haptic transducer; and
   a haptic control subsystem configured to:
      determine whether a frequency response of a haptic playback waveform has a notch with a notch frequency at approximately the resonant frequency of the haptic transducer; and
      responsive to the notch frequency differing from the resonant frequency, modify the haptic playback waveform for playback to the haptic transducer by shifting the notch frequency to approximately the resonant frequency.

12. The mobile device of claim 11, the haptic control subsystem further configured to, responsive to an absence of a notch in the frequency response of the haptic playback waveform, modify the haptic playback waveform for playback to the haptic transducer by applying a notch filter at approximately the resonant frequency to the haptic playback waveform.

13. The mobile device of claim 11, the haptic control subsystem further configured to, responsive to the notch frequency being approximately equal to the resonant frequency, play back the haptic playback waveform without modification to the haptic transducer.

14. The mobile device of claim 11, wherein the shifting of the notch frequency to approximately the resonant frequency comprises:
   determining a time scaling factor as a ratio between the notch frequency and the resonant frequency; and
   time scaling the haptic playback waveform by the time scaling factor, such that the haptic playback waveform as modified $v_T(t)=v_R(ct)$, where $v_R(t)$ defines the haptic playback waveform without modification as a function of time, and c is the time scaling factor.

15. The mobile device of claim 14, wherein the shifting of the notch frequency to approximately the resonant frequency further comprises applying an amplitude compensation factor to compensate the haptic playback waveform as modified such that a depth of the resulting notch in the frequency response of the haptic playback waveform as modified is approximately equal to the depth of the notch in the frequency response of the haptic playback waveform prior to modification.

* * * * *